United States Patent
Ku

(10) Patent No.: US 7,013,130 B2
(45) Date of Patent: Mar. 14, 2006

(54) MOBILE TERMINAL HAVING BOOKMARK FUNCTION AND METHOD FOR QUICKLY EXECUTING THE BOOKMARK FUNCTION

(75) Inventor: Won-Mo Ku, Seoul (KR)

(73) Assignee: Samsung Electronics Co. Ltd., (KR)

( * ) Notice: Subject to any disclaimer, the term of this patent is extended or adjusted under 35 U.S.C. 154(b) by 210 days.

(21) Appl. No.: 10/631,656

(22) Filed: Jul. 31, 2003

(65) Prior Publication Data

US 2004/0116148 A1 Jun. 17, 2004

(30) Foreign Application Priority Data

Dec. 17, 2002 (KR) .................. 10-2002-0080606

(51) Int. Cl.
*H04Q 7/20* (2006.01)

(52) U.S. Cl. ............... 455/414.2; 455/418; 455/414.1

(58) Field of Classification Search ............. 455/414.1, 455/414.2, 414.3, 418
See application file for complete search history.

(56) References Cited

U.S. PATENT DOCUMENTS

| 6,463,304 B1* | 10/2002 | Smethers ................. 455/566 |
| 6,781,575 B1* | 8/2004 | Hawkins et al. ............ 345/173 |
| 6,842,612 B1* | 1/2005 | Kalish et al. ............ 455/414.2 |
| 2002/0126153 A1* | 9/2002 | Withers et al. ............. 345/773 |
| 2004/0029525 A1* | 2/2004 | Vertelney ................ 455/3.03 |
| 2004/0203729 A1* | 10/2004 | Makipaa et al. .......... 455/426.1 |

* cited by examiner

*Primary Examiner*—Erika A. Gary
(74) *Attorney, Agent, or Firm*—Dilworth & Barrese, LLP

(57) ABSTRACT

A mobile terminal having a bookmark function and a method for quickly executing the bookmark function. The mobile terminal for executing a wireless Internet access function and bookmarking a wireless Internet site includes a key entry unit having a bookmark hot key and a plurality of number keys; a memory for storing bookmark information created by assigning a unique ID number to a bookmarked Internet site from among a plurality of Internet sites accessible by the wireless Internet access function; and a controller for reading out an address of an Internet site corresponding to an ID number of a predetermined number key from the memory when the bookmark hot key and the predetermined number key are pushed on the key entry unit, and executing the wireless Internet access function.

13 Claims, 3 Drawing Sheets

MOBILE TERMINAL HAVING BOOKMARK FUNCTION AND METHOD FOR QUICKLY EXECUTING THE BOOKMARK FUNCTION

PRIORITY

This application claims priority to an application entitled "MOBILE TERMINAL HAVING BOOKMARK FUNCTION AND METHOD FOR QUICKLY EXECUTING THE BOOKMARK FUNCTION", filed in the Korean Intellectual Property Office on Dec. 17, 2002 and assigned Serial No. 2002-80606, the contents of which are hereby incorporated by reference.

BACKGROUND OF THE INVENTION

1. Field of the Invention

The present invention relates to a mobile terminal having a bookmark-registered wireless Internet access function and a method for executing such a bookmark function.

2. Description of the Related Art

In recent times, it is common for personal handheld mobile terminals such as a cellular phone and a PCS (Personal Communication System) phone to have a wireless Internet access function.

Therefore, such personal handheld mobile terminals can gain access to a wireless Internet network to use a variety of Internet sites managed by Internet information providers. A user can store web sites of interest in a bookmark list through the use of a bookmark registration function of a Web browser.

When a user attempts to access one of web sites stored in the bookmark list, the user enters a browser main menu using a browser-dedicated key, selects a bookmark menu on the main menu, selects a desired bookmark-registered category topic from the bookmark menu, and thereby gains access to a corresponding web site contained in the selected bookmark-registered category.

However, the aforementioned conventional bookmark scheme has a disadvantage in that a user must enter many keys or buttons on his or her mobile terminal to access a desired web site. In other words, as the user attempts to access such a desired web site, the user is likely to spend much time and effort in accessing the desired web site because a browser menu on a main menu must be first activated before a corresponding web site can be selected from one of a plurality of broad categories contained in the browser menu.

SUMMARY OF THE INVENTION

Therefore, the present invention has been made in view of the above problems, and it is an object of the present invention to provide a mobile terminal for enabling a user to quickly access one of his or her bookmarked Internet sites stored in a bookmark list through the use of a simple key entry operation, and a method for quickly executing a bookmark function of the mobile terminal.

It is another object of the present invention to provide a mobile terminal for quickly executing a bookmark function using a hot key, and a method for controlling the same.

In accordance with one aspect of the present invention, the above and other objects can be accomplished by the provision of a mobile terminal for executing a wireless Internet access function and bookmarking a wireless Internet site, comprising: a key entry unit having a bookmark hot key and a plurality of number keys; a memory for storing bookmark information created by assigning a unique ID number to a bookmarked Internet site among a plurality of Internet sites accessible by the wireless Internet access function; and a controller for reading out an address of an Internet site corresponding to an ID number of a predetermined number key from the memory when the bookmark hot key and the predetermined number key are pushed on the key entry unit, and executing the wireless Internet access function.

In accordance with another aspect of the present invention, there is provided a method for quickly executing a bookmark function of a mobile terminal which executes a wireless Internet access function and bookmarks a wireless Internet site, comprising the steps of: a) assigning an ID number of a predetermined number key to at least one wireless Internet site, and previously storing the ID number as bookmark hot key information; b) receiving a bookmark hot key and the predetermined number key from a user; and c) reading out an address of an Internet site corresponding to an ID number of the predetermined number key, and executing a wireless Internet access function.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
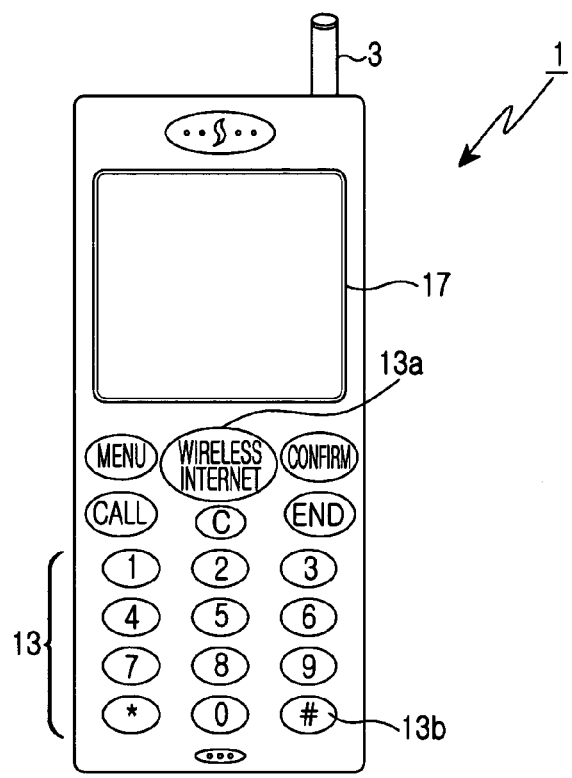
FIG. 1 is a view illustrating the front panel of a personal mobile terminal for quickly executing a bookmark function using a hot key in accordance with a preferred embodiment of the present invention.

Now, preferred embodiments of the present invention will be described in detail with reference to the annexed drawings. In the drawings, the same or similar elements are denoted by the same reference numerals even though they are depicted in different drawings. In the following description, detailed description of known functions and configurations incorporated herein is omitted to avoid making the subject matter of the present invention unclear.

FIG. 1 is a view illustrating the front panel of a personal mobile terminal for quickly executing a bookmark function using a hot key in accordance with a preferred embodiment of the present invention. Referring to FIG. 1, an outer casing of a mobile terminal includes an antenna 3 for transmitting/receiving an RF signal, a key entry unit 13 for a user interface, and a display 17 for displaying a program execution screen according to a key entry result from the key entry unit 13.

The key entry unit 13 commonly includes a plurality of number keys 0~9, a plurality of function keys composed of a menu key, a call origination key, a deletion key C, an end key, and specific character keys, such as # (13b) and *, and a Wireless Internet Access Key 13a.

Figure 2:
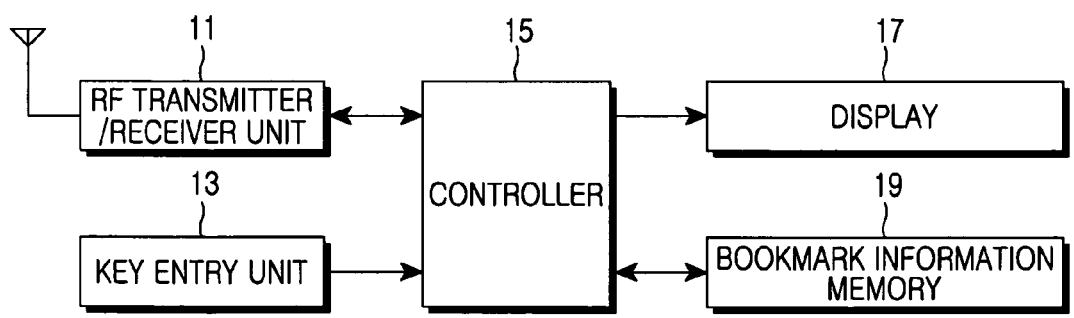
FIG. 2 is a block diagram of the mobile terminal shown in FIG. 1 in accordance with a preferred embodiment of the present invention.

FIG. 2 is a block diagram of the mobile terminal shown in FIG. 1 in accordance with a preferred embodiment of the present invention. Referring to FIG. 2, the mobile terminal includes an RF transmitter/receiver unit 11 for transmitting/receiving RF signals; the key entry unit 13 serving as a user interface part having a plurality of keys for entering numbers and letters or characters, such as Korean and English characters, in the mobile terminal; a controller 15 for processing a phone number entered by the key entry unit 13, and performing consecutive operations; the display 17 for displaying a variety of operations and information accompanying such operations; and a bookmark information memory 19 for storing each Internet site access information corresponding to each key of the key entry unit 13. The bookmark information memory 19 is controlled by the controller 15.

The controller 15 includes a CPU (not shown) for calculating and controlling transmission/reception of data, and a memory (not shown) for storing codes of an execution program for performing a voice transmission/reception function and a wireless Internet access function using the RF transmitter/receiver unit 11.

The controller 15 enters a bookmark registration mode upon receiving a menu selection signal from a user. If the user selects a desired Internet site on the bookmark registration menu, the controller 15 assigns an ID (Identification) number to the selected Internet site and then stores the selected Internet site with the ID number in the bookmark information memory 19. In this case, preferably, the ID number is upward-sequentially and automatically assigned to such bookmarked Internet sites according to a selection order of Internet sites bookmarked by a user. In more detail, provided that a user selects a first Internet site to be bookmarked, this first Internet site is assigned an ID number '0' by the controller 15. Then, provided that the user selects a second Internet site to be bookmarked, this second Internet site is assigned the ID number '1' from the controller 15. That is, a unique ID number is assigned to each bookmarked web sites in ascending numerical order. Alternatively, the user may specify the ID number using the key entry unit 13, or allow the ID number to be randomly assigned to such bookmarked Internet site.

The key entry unit 13 includes a hot key for quickly executing a bookmark function. The following description assumes that the hot key is predetermined as a specific character key 13b (e.g. '#'), though another specific key may be assigned from among the plurality of keys contained in the key entry unit 13 of the mobile terminal shown in FIG. 1. The controller 15 is switched to a bookmark execution mode when the specific character key 13b ('#') is pushed by a user in an idle state of a mobile terminal 1. In the case where another one of the number keys (e.g. 0~9) is pushed after the hot key 13b '#' has been pushed, the controller 15 reads out one bookmarked Internet site corresponding to the selected number key with reference to the bookmark information memory 19. The controller 15 will, preferably, wait until a key-pushed duration time of a corresponding number key exceeds a predetermined time before determining that this key entry state command has been given for quickly executing a bookmark function.

In the meantime, such bookmark execution may be performed on the assumption that the character key 13b ('#') and one of number keys 0~9 are pushed at the same time, i.e. simultaneously. Further, the number key for quickly executing a bookmark function may be set to a combination of at least two number keys, thereby expanding the potential number of bookmarked Internet sites.

Figure 3:
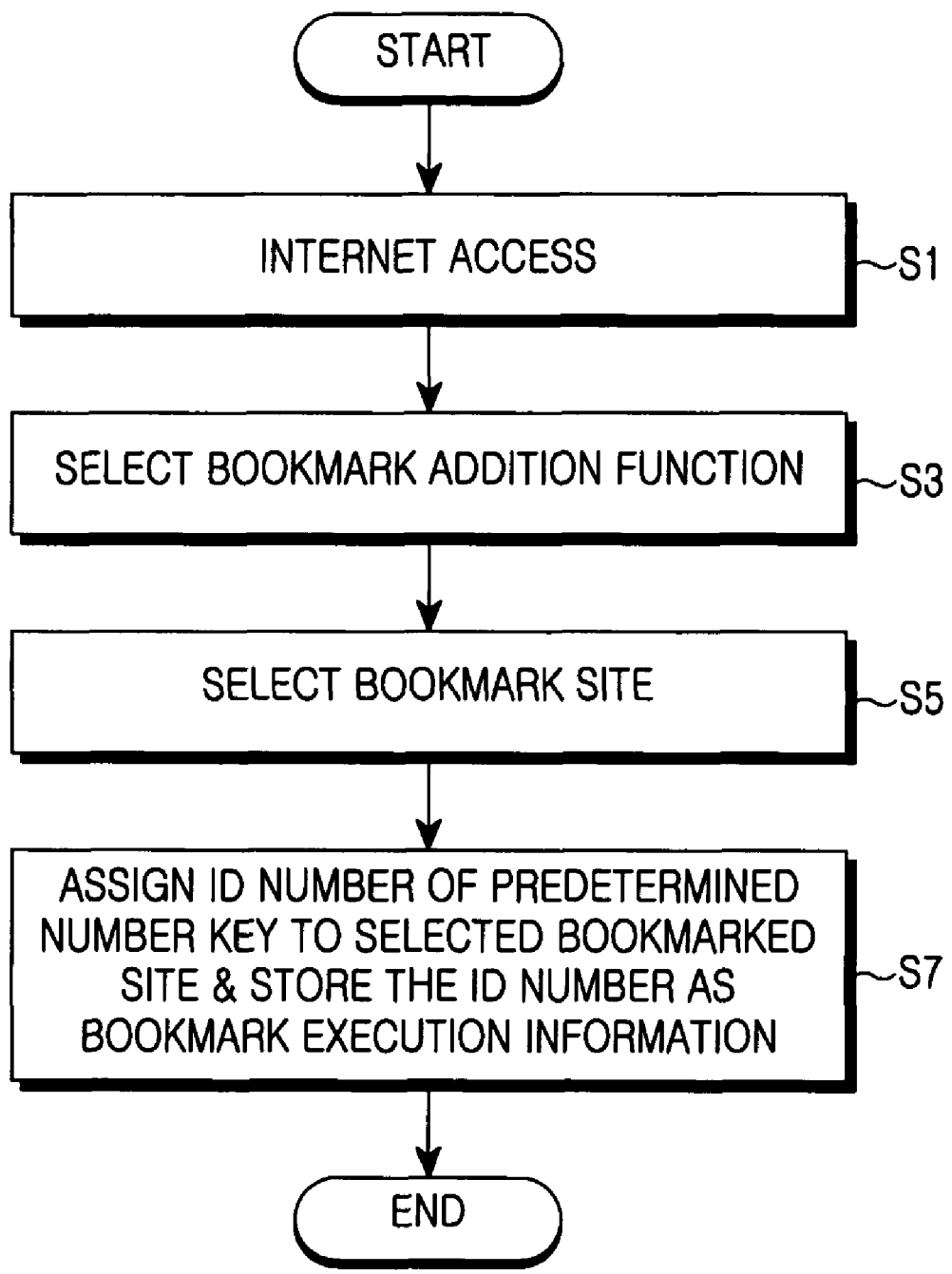
FIG. 3 is a flow chart illustrating a procedure for performing a bookmark registration function in a mobile terminal in accordance with a preferred embodiment of the present invention.

FIG. 3 is a flow chart illustrating a procedure for performing a bookmark registration in a mobile terminal in accordance with a preferred embodiment of the present invention. Referring to FIG. 3, if the user selects the wireless Internet access key on the key entry unit 13, the controller accesses the Internet via RF transmitter/receiver 11 at step S1, and displays a plurality of Internet sites each having a bookmark menu for executing a bookmark addition function. If the user selects the bookmark addition function on his or her mobile terminal at step S3, the controller 15 continues to display the plurality of Internet sites on the display 17, and receives information of a selected bookmark site among a plurality of Internet sites from the user at step S5. The controller 15 assigns a predetermined ID number to the selected bookmark site, and stores it in the bookmark information memory 19 as bookmark execution information at step S7. Herein, provided that the user sequentially selects a plurality of bookmark sites, the ID number is sequentially assigned to the selected bookmark sites in preferably ascending numerical order according to the user-selection order of the bookmark sites.

Figure 4:
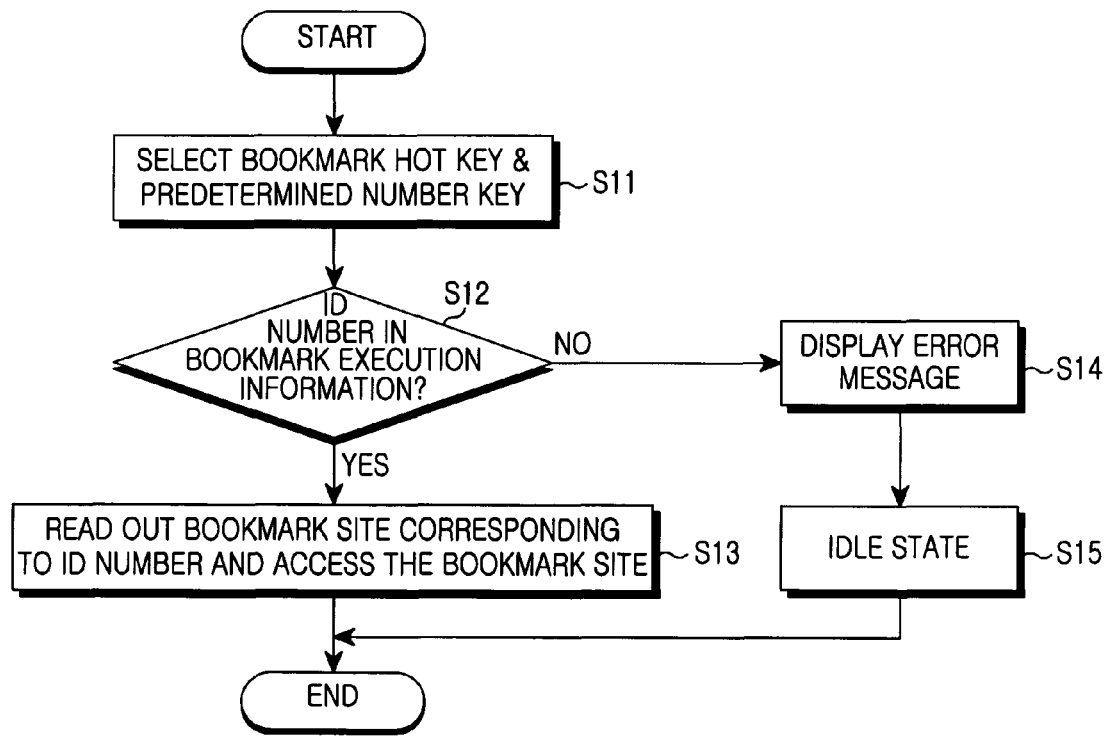
FIG. 4 is a flow chart illustrating a procedure for performing a bookmark execution function in a mobile terminal in accordance with a preferred embodiment of the present invention.

FIG. 4 is a flow chart illustrating a procedure for performing a bookmark execution function in a mobile terminal in accordance with a preferred embodiment of the present invention. Referring to FIG. 4, if the user selects the bookmark hot key of his or her mobile terminal at step S11, the controller 15 is switched to the bookmark execution mode. Then, if the user selects a predetermined number key, the controller 15 determines at step S12 whether an ID number of the selected number key exists in the bookmark information memory 19. If it is determined at step S12 that the ID number of the selected number key exists in the bookmark information memory 19, the controller 15 reads out the bookmarked Internet site corresponding to the selected number key, and accesses the bookmarked Internet site. Otherwise, if it is determined at step S12 that there is no ID number of the selected number key in the bookmark information memory 19, the controller 15 displays an error message on the display 17 at step S14 and switches to an idle state of the mobile terminal at step S15.

In this manner, each number key on the key entry unit 13 of the mobile terminal 1 is determined as a hot key for quickly accessing a bookmarked Internet site such that a user quickly gains access to his or her favorite sites (i.e. bookmarked Internet sites) using a simple key entry operation on the key entry unit 13, without individually executing a plurality of bookmark execution menus.

Although the aforesaid preferred embodiment of the present invention describes that the bookmark hot key is set to one of function and specific character keys, the bookmark hot key may be set to an additional key to execute a bookmark function.

As apparent from the above description, a controller according to the present invention automatically assigns a predetermined ID number which increases one by one from zero to each of a plurality of bookmark sites such that the assigned ID number is stored in the bookmark information memory as bookmark hot key information. Alternatively, a GUI (Graphic User Interface) may be provided by the controller to assign ID numbers to user-desired number keys for each bookmarked Internet site.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A mobile terminal for executing a wireless Internet access function and bookmarking a wireless Internet site, comprising:
   a key entry unit having a bookmark hot key and a plurality of number keys;
   a memory for storing bookmark information created by assigning a unique ID number to a specific wireless Internet site from among a plurality of wireless Internet sites accessible by the wireless Internet access function; and
   a controller for reading out an address of a bookmarked wireless Internet site corresponding to an ID number of a predetermined number key from the memory when the bookmark hot key is pushed on the key entry unit and the predetermined number key is pushed on the key entry unit either simultaneously with the bookmark hot key or after the bookmark hot key and held for a predetermined time, and executing the wireless Internet access function.

2. The mobile terminal as set forth in claim 1, wherein the controller assigns the unique ID number to a specific wireless Internet site to be bookmarked, and stores the unique ID number in the memory as bookmark information of the specific bookmarked wireless Internet site.

3. The mobile terminal as set forth in claim 1, wherein the controller displays an error message on a display when the wireless Internet site corresponding to an ID number of a number key selected by a user via the key entry unit does not exist in the memory, and then switches to an idle state.

4. The mobile terminal as set forth in claim 1, wherein the bookmark hot key is set to one of specific function keys having specific character keys, which include # and * of the key entry unit.

5. The mobile terminal as set forth in claim 1, wherein the controller accesses a wireless Internet site corresponding to the predetermined number key after a key-pushed duration time of the predetermined number key entered after the bookmark hot key is longer than a predetermined time.

6. The mobile terminal as set forth in claim 1, wherein the controller accesses an Internet site corresponding to the predetermined number key when the bookmark hot key and the predetermined number key are simultaneously pushed.

7. The mobile terminal as set forth in claim 1, wherein the controller assigns the unique ID number to the specific wireless Internet site in response to user input received from a Graphic User Interface (GUI).

8. A method for quickly executing a bookmark function of a mobile terminal which executes a wireless Internet access function and bookmarks a wireless Internet site, comprising the steps of:
   assigning an ID number of a predetermined number key to a wireless Internet site, and previously storing the ID number as bookmark hot key information;
   receiving a bookmark hot key and the predetermined number key from a user; and
   reading out an address of the wireless Internet site corresponding to the previously stored ID number of the predetermined number key, and executing the wireless Internet access function when the predetermined number key is pushed either simultaneously with the bookmark hot key or after the bookmark hot key and held for a predetermined time.

9. The method as set forth in claim 8, further comprising the step of:
   displaying an error message when the ID number of a selected predetermined number key does not exist as bookmark hot key information, and switching to an idle state.

10. The method as set forth in claim 8, wherein the bookmark hot key is set to one of specific function keys having specific character keys, which include # and *.

11. The method as set forth in claim 8, wherein the step for executing the wireless Internet access function accesses the wireless Internet site corresponding to the predetermined number key when a key-pushed duration time of the predetermined number key entered after the bookmark hot key is longer than a predetermined time.

12. The method as set forth in claim 8, wherein the step for executing the wireless Internet access function accesses the wireless Internet site corresponding to the predetermined number key when the bookmark hot key and the predetermined number key are simultaneously pushed.

13. A method for quickly executing a bookmark function of a mobile terminal which has a wireless Internet access function and a bookmark setup function of a wireless Internet site, and a memory for storing bookmark information created by assigning a unique ID number to a bookmarked Internet site among a plurality of Internet sites accessible by the wireless Internet access function, comprising the steps of:
   receiving a bookmark hot key and a predetermined number key from a user; and
   reading out an address of the wireless Internet site corresponding to the unique ID number of the predetermined number key when the predetermined number key is pushed either simultaneously with the bookmark hot key or after the bookmark hot key and held for a predetermined time, and executing a wireless Internet access function.

* * * * *